United States Patent [19]

Farrington et al.

[11] 4,197,365
[45] Apr. 8, 1980

[54] SOLID ION-CONDUCTIVE ELECTROLYTE AND METHOD OF FORMING

[75] Inventors: Gregory C. Farrington, Clifton Park; Manfred W. Breiter, Schenectady, both of N.Y.

[73] Assignee: General Electric Company, Schenectady, N.Y.

[21] Appl. No.: 940,175

[22] Filed: Sep. 7, 1978

[51] Int. Cl.² .............................................. H01M 6/18
[52] U.S. Cl. ..................................... 429/193; 429/188
[58] Field of Search .................. 429/193, 191, 33, 46, 429/30–32, 188; 252/62.2

[56] References Cited

U.S. PATENT DOCUMENTS

| 4,032,694 | 6/1977 | Dubin et al. | 429/33 |
| 4,135,040 | 1/1979 | Thornton | 429/191 |

OTHER PUBLICATIONS

"B-Alumina Electrolytes" by J. T. Kummer, "Progress in Solid State Chemistry", vol. 7, Pergamon Press, New York (1972), p. 150.
"The Crystal Structure of $Na_2O.MgO.5Al_2O_3$ with Reference to $Na_2O.5Al_2O_3$ and Other Isotypal Compounds" by M. Bettman and C. R. Peters, "Journal of Physical Chemistry", 73, pp. 1774–1780 (1969).
"Ion Transport in $H_3O+$ Beta and $H_3O+$ Beta" Alumina" Extended Abstracts of the Electrochemical Society, Atlanta Meeting, Oct. 9–14, 1977, 77–72, 822 (1977).

*Primary Examiner*—Anthony Skapars
*Attorney, Agent, or Firm*—Paul R. Webb, II; James C. Davis, Jr.

[57] ABSTRACT

A solid ion-conductive electrolyte consists essentially of hydronium beta"-alumina having the formula $$nH_2O \cdot nX.5Al_2O_3 \cdot qH_2O$$

wherein n is a range from 0.75 to 1; X is an oxide selected from the group consisting of MgO, $Li_2O$, and $m(MgO)p(Li_2O)$ wherein the total of m and p equals n; and q is a range from 0 to 2.8. A method is disclosed for forming such a solid ion-conductive electrolyte.

3 Claims, No Drawings

SOLID ION-CONDUCTIVE ELECTROLYTE AND METHOD OF FORMING

The present invention relates to a solid ion-conductive electrolyte and to a method of forming, and more particularly, to a solid electrolyte consisting essentially of hydronium beta"-alumina and to a method of forming.

Solid ion-conductive electrolytes are useful in electrochemical cells such as fuel cells and electrolyzers.

Reference is made to U.S. Pat. No. 4,032,694-Dubin, et al issued June 28, 1977 and entitled "Fuel Cell With Hydronium Beta-Alumina Electrolyte". The subject patent describes a gaseous fuel cell which has a solid hydronium beta-alumina electrolyte positioned between and in direct electrical contact with a pair of gas permeable, electronically conductive electrodes. This patent is assigned to the same assignee as the present application. This patent does not suggest, disclose or teach the solid ion-conductive electrolyte of hydronium beta"-alumina of the present application.

Reference is made to an Article entitled "B-Alumina Electrolytes" by J. T. Kummer in "Progress In Solid State Chemistry", Vol. 7, Pergamon Press, New York (1972), page 150. It is pointed out in the last three lines on this page that the complete exchange of beta-alumina has been reported for the sodium ion including in the group, $H_3O^+$. This article does not suggest, disclose or teach the solid ion-conductive electrolyte of hydronium beta"-alumina of the present invention.

Beta-alumina is converted to hydronium beta-alumina by immersing beta-alumina crystals in concentrated sulfuric acid at temperature in the range from 270° to 290° for a period of ten to fifteen days.

Reference is made to a French Article by J. Thery and D. Briancon in "Compte Rendus" 254, 2782-2784 (1962). Paragraph (d), first sentence, on page 2782 sets forth that the aluminate of $NaAl_5O_8$ undergoes hydrolysis in boiling water accompanied by partial replacement of the sodium. The Article refers to sodium beta"-alumina in which partial hydronium ion substitution is accomplished but without the addition of MgO, $Li_2O$, or (MgO)($Li_2O$) is crystalline structure stabilizers.

Reference is made to an Article entitled "The Crystal Structure of $Na_2O.MgO.5Al_2O_3$ with Reference to $Na_2O.5Al_2O_3$ and Other Isotypal Compounds" by M. Bettman and C. R. Peters in the "Journal of Physical Chemistry", 73, pages 1774–1780 (1969). On page 1779, column 2, lines 35–52, it is pointed out that B"-alumina easily hydrolyzes in boiling water, as noted by the above-mentioned Thery, et al reference. Further, it is pointed out that hydrolysis was studied with cold HCl from which it appeared that many of the sodium ions can be replaced by hydrogen ions, and an unspecified amount of excess water moves into the planes at the same time. This Article does not disclose or teach the substantially complete conversion of beta"-alumina into hydronium beta"-alumina as set forth in the present application.

Reference is made to an abstract entitled "Ion Transport in $H_3O^+$ Beta and $H_3O^+$ Beta" Alumina" published in the "Extended Abstracts" of the Electrochemical Society, Atlanta Meeting, October 9–14, 1977, 71-2, 822 (1977). This abstract was authored by the inventor of the present subject matter and co-authored by J. L. Briant. This abstract sets forth that it appears possible to replace the entire sodium ion content of sodium beta"-alumina with the hydronium ion by equilibration with aqueous $H_2SO_4$ between 50° and 300° C., the subject matter of the present application.

Reference is made to copending U.S. patent application, Ser. No. 862,535, filed Dec. 20, 1977, in the name of Roy F. Thornton entitled "Solid Ion-Conductive Electrolyte Body and Method of Forming". The subject application describes and claims a solid ion-conductive electrolyte body with specific types of textured surfaces. On page 6 of this application, line 15, hydronium beta"-alumina is set forth as a solid ion-conductive electrolyte body which can be employed in the invention. This patent application is assigned to the same assignee as the present application.

The present invention is directed to an improved solid ion-conductive electrolyte and to a method of forming.

The primary objects of our invention are to provide a solid ion-conductive electrolyte with a high proton conductivity.

In accordance with one aspect of our invention, a solid ion-conductive electrolyte consists essentially of hydronium beta"-alumina having the formula $$nH_2O.nX.5Al_2O_3.qH_2O$$

wherein n is a range from 0.75 to 1/ X is an oxide selected from the group consisting of MgO, $Li_2O$ and $m(MgO)p(Li_2O_3)$ wherein the total of m and p equal n; and q is a range from 0 to 2.8.

These and various other objects, features, and advantages of the invention will be better understood from the following description.

We can form hydronium beta"-alumina from sodium beta"-alumina. The sodium beta"-alumina has the formula $$n(Na_2O).nX.5Al_2O_3$$

wherein n is in the range from 0.75 to 1.0; and X is an oxide selected from the group consisting of Mg, $Li_2O_3$, and $m(MgO)p(Li_2O_3)$ wherein the total of m and p equals n. Single crystals of sodium beta"-alumina with the average composition of $0.84Na_2O.0.84MgO.5Al_2O_3$ were grown from a melt of 35 weight percent $Na_2CO_3$, 3.2 weight percent MgO, and 62 weight percent $Al_2O_3$ by heating the mixture in a covered platinum crucible to 1600° C. for 24 hours and cooling to 25° C. over 12 hours. As $Na_2O$ vaporized, the crystals grew as thin platelets about $2\times2\times0.2$ mm on the surface of the melt. The composition was determined by sodium and magnesium analysis. Powder pattern X-ray diffraction was used to verify the crystal structures.

The above sodium beta"-alumina composition was converted essentially to hydronium beta"-alumina by immersing the crystals in concentrated sulfuric acid at 240° C. for 36 hours. Subsequently, the crystals were washed in water and air dried. Sodium analysis after this ion exchange process found less than five percent of the original sodium content remaining in the crystals. The resulting crystals consisted essentially of hydronium beta"-alumina.

While crystals of sodium beta"-alumina were employed to produce the hydronium beta"-alumina, other forms and shapes of sodium beta"-alumina can be used to form corresponding forms of hydronium beta"-alumina. Such forms and shapes can include discs, caps, tubes, etc. Sodium beta"-alumina with $Li_2O$ or MgO.-

Li$_2$O can be prepared in a similar manner by substitution of Li$_2$O or MgO.Li$_2$O resulting in a corresponding hydronium beta"-alumina.

In our method of making a solid ion-conductive electrolyte consisting essentially of hydronium beta"-alumina of the above-identified formula, we provide sodium beta"-alumina of the above-identified formula. The sodium beta"-alumina is immersed concentrated sulfuric acid in a temperature range from 50° to 300° C. wherein a preferred temperature range is 50° to 150° C. The immersion is for a period of 12 hours to 36 hours with a preferred period of 12 hours to 15 hours. It will be noted in our method that the time period of immersion is from 12 hours to 36 hours as opposed to 10 to 15 days to form hydronium beta-alumina. The resulting electrolyte is made in accordance with our invention.

Examples of solid ion-conductive electrolytes and a method of forming such electrolytes in accordance with our invention are set forth below:

EXAMPLE I

A plurality of single crystals of sodium beta"-alumina with the average composition of 0.84 Na$_2$O.O.84MgO.5Al$_2$O$_3$ were grown from a melt of 35 weight percent Na$_2$CO$_3$,3.2 weight percent MgO, and 62 weight percent Al$_2$O$_3$ by heating the mixture in a covered platinum crucible to 1600° C. for 24 hours and cooling over 12 hours. As Na$_2$O vaporized, the crystals grew as thin platelets about 2×2×0.2 mm on the surface of the melt. The composition was determined by sodium and magnesium analysis. Powder pattern X-ray diffraction was used to verify the crystal structures.

The above sodium beta"-alumina composition was converted essentially to hydronium beta"-alumina by immersing the crystals in concentrated sulfuric acid at 240° C. for 35 hours. Subsequently, the crystals were washed in water and air dried. Sodium analysis after this ion exchange process found less than five percent of the original sodium content remaining in the crystals. The resulting crystals consisted essentially of hydronium beta"-alumina made in accordance with our invention.

EXAMPLE II

The conductivities of six hydronium beta"-alumina crystals of Example I were measured. Five crystals were measured with non-blocking agar gel or polyethylene oxide ion exchange membrane electrodes, and one with gold blocking electrodes. Impedances were measured with a Hewlett-Packard 3040 A Network Analyzer. With non-blocking electrodes the impedance of each crystal was found to be invariant within 10% from $10^2$ to $10^5$ Hz with a phase shift of less than 10°. Measurements with blocking electrodes were carried out from $10^2$ to $10^7$ Hz and found to approach a straight line intersecting the real axis on a complex impedance plot at high frequencies. The real intercept was taken as the sample resistance which agreed closely with that measured with nonblocking electrodes.

The crystals were mounted for analysis using several different techniques. To prevent liquid electrolyte from the agar or polyethylene oxide electrodes from creeping around the crystals, the crystals were cast in epoxy resin which was then ground away expose the crystal edges. Crystals were also measured mounted in paraffin. For blocking electrode experiments, the crystals were mounted with insulating varnish on alpha alumina discs, and gold electrodes were sputtered onto the edges.

Our experimental results using non-blocking electrodes showing hydronium beta"-alumina conductivity at 250° C. are summarized in Table I set forth below:

TABLE I

| Crystal | Conductivity (ohm cm)$^{-1}$ | Mounting |
|---|---|---|
| A | $8.7 \times 10^{-3}$ | Epoxy |
|   | $1.8 \times 10^{-2}$ |  |
|   | $2.5 \times 10^{<2}$ |  |
|   | $1.7 \times 10^{-2}$ |  |
| B | $6.7 \times 10^{-3}$ | Epoxy |
|   | $1.7 \times 10^{-2}$ |  |
|   | $3.6 \times 10^{-3}$ |  |
|   | $2.3 \times 10^{-3}$ |  |
| C | $2.3 \times 10^{-3}$ | Epoxy |
| D | $4.0 \times 10^{-3}$ | Epoxy |
|   | $8.3 \times 10^{-3}$ |  |
| E | $5.3 \times 10^{-3}$ | Paraffin |
|   | $4.8 \times 10^{-3}$ |  |
|   | $6.7 \times 10^{-3}$ |  |
|   | $4.8 \times 10^{-3}$ |  |
|   | $9.5 \times 10^{-3}$ |  |
| Average Conductivity = $5 \times 10^{-3}$ (ohm cm)$^{-1}$ | | |

While other modifications of the invention and variations there of which may be employed within the scope of the invention have not been described, the invention is intended to include such as may be embraced within the following claims

What we claim as new and desire to secure by Letters Patent of the United States is:

1. A solid ion-conductive electrolyte consisting essentially of hydronium beta"-alumina having the formula $$nH_2O.nX.5Al_2O_3.qH_2O$$

wherein n is a range from 0.75 to 1.0; and X is an oxide selected from the group consisting of MgO, Li$_2$O, m(MgO)p(Li$_2$O) wherein the total of m and p equal n; and q is a range from 0 to 2.8.

2. A solid ion-conductive electrolyte as in claim 1, in which the hydronium beta"-alumina has the formula $$0.84H_2O.0.84MgO.5Al_2O_3.2.8H_2O$$

3. A solid ion-conductive electrolyte as in claim 1, in which the hydronium beta"-alumina is in the form of single crystals.

* * * * *